United States Patent [19]
Yajima et al.

[11] 4,378,156
[45] Mar. 29, 1983

[54] METHOD OF ELIMINATING BLACK BANDING OCCURRING IN THE PROCESS OF RECORDING COMPOUND INFORMATION

[75] Inventors: Tatsuo Yajima; Hiroya Nakamura, both of Hachioji, Japan

[73] Assignee: Konishiroku Photo Industry Co., Ltd., Tokyo, Japan

[21] Appl. No.: 154,147

[22] Filed: May 28, 1980

[30] Foreign Application Priority Data

May 31, 1979 [JP] Japan .................................. 54/66855

[51] Int. Cl.³ ........................ G03B 27/32; G03B 27/72
[52] U.S. Cl. .......................................... 355/77; 355/7; 355/14 E; 355/69; 355/71
[58] Field of Search .............. 355/3 R, 7, 14 R, 14 E, 355/20, 69, 77, 71

[56] References Cited

U.S. PATENT DOCUMENTS

| | | |
|---|---|---|
| 3,681,527 | 8/1972 | Nishiyama et al. ......... 355/3 R UX |
| 4,042,962 | 8/1977 | Yamaji et al. .................. 355/3 R X |
| 4,251,152 | 2/1981 | Miyakawa et al. ................. 355/3 R |
| 4,296,423 | 10/1981 | Nakamura ..................... 355/14 E X |
| 4,303,332 | 12/1981 | Sakai ................................... 355/7 X |

FOREIGN PATENT DOCUMENTS

| | | |
|---|---|---|
| 1443371 | 7/1976 | United Kingdom . |
| 1503047 | 3/1978 | United Kingdom . |
| 1514605 | 6/1978 | United Kingdom . |

*Primary Examiner*—Fred L. Braun
*Attorney, Agent, or Firm*—Jordan B. Bierman; Linda Bierman

[57] ABSTRACT

A method of eliminating black banding occurring along the boundary line of an exterior information signal image and a pictorial original image in the process of recording compound information includes control of the luminance intensity of a scanning reproducing device immediately prior to and/or immediately following external information transfer thereby onto the photosensitive receiving surface. Such control provides gradual, timed increase of the luminance intensity of the device immediately prior to normal activation thereof, and/or gradual, timed decrease of the luminance intensity of the device immediately following normal deactivation thereof, so as to predeterminately merge the compounded images and thereby eliminate the black banding phenomenon.

4 Claims, 5 Drawing Figures

ORIGINAL POSITION DETECTING SIGNAL (CHANGING SIGNAL OF THE MODE)

SHUTTER OPERATION OPEN/CLOSE

CHANGING SIGNAL FOR DELAY

CORRECT SIGNAL FOR DISCREPANCY OF POSITION

TIME CORRECTING SIGNAL BASED ON THE SHUTTER OPENING/CLOSING

SIGNAL OF LUMINOUS INTENSITY BY EXTERNAL INFORMATION

COMPOSITE SIGNAL OF LUMINOUS INTENSITY

METHOD OF ELIMINATING BLACK BANDING OCCURRING IN THE PROCESS OF RECORDING COMPOUND INFORMATION

FIELD OF THE INVENTION

The present invention relates to a method of eliminating black banding occurring along the boundary line of an exterior information signal image and a pictorial original image, in a compound information recording process. Such a process concerns the recording of a compound image onto recording paper by an electrophotographic process utilizing external information supplied in the form of electric signals and an original to be optically copied through placement on table or copy board.

The invention will become more apparent from the following detailed description of a preferred embodiment taken in conjunction with the accompanying drawings.

DETAILED DESCRIPTION OF THE PREFERRED EMBODIMENT

Figure 1:
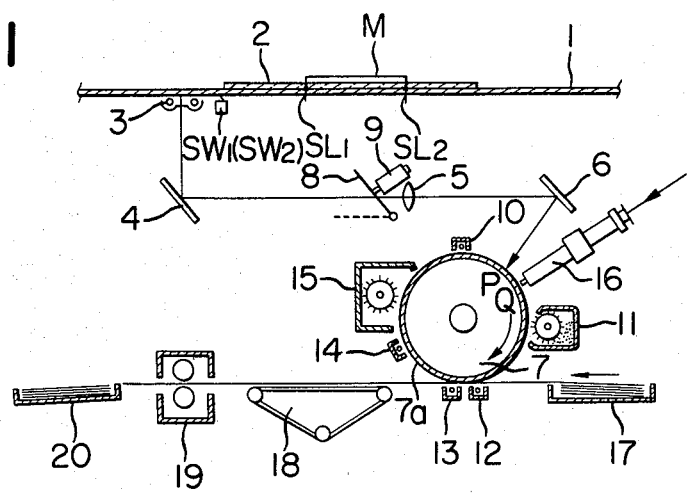
FIG. 1 attached hereto is a diagrammatic illustration of a compound information recording apparatus constructed in accordance with the teachings of the present invention.

FIG. 1 is a diagrammatic illustration of a compound information recording apparatus. A reciprocable original table or copy board 2 for supporting thereon an original M to be copied, and an exposure lamp 3 for irradiating the original M, are provided at the upper portion of the apparatus—as on an upper frame 1. Light reflected from the original M passes through an optical system comprising a first mirror 4, lens 5, and second mirror 6, and is directed onto a rotatable drum 7. The reflected image is thereby focussed on a photosensitive substance or member 7a (such as of Se, ZnO) disposed on the circumferential surface of drum 7. In order to selectively shield or block the reflected light, a mechanical shutter 8 is placed in the path of the optical system, the optical path being opened and closed or shielded by an operating means 9 which includes a solenoid.

Various devices are placed circumferentially about drum 7, including an electric charger 10 for uniformly charging photosensitive substance 7a, a developing device 11 for changing an electrostatic latent image formed on substance 7a to a visible toner image in accordance with the recording and copying operation, an image transfer electrode 12 for transferring the toner image from drum 7 onto a recording material such as plain paper, a separating electrode, a neutralizing electrode 14, and a cleaning device 15, in that order. At the upstream side of the developing device 11 (as viewed in the rotative direction of drum 7), there is provided a scanning reproducing device 16 by which exterior information supplied in the form of electric signals is converted to an optical image and is focused on the photosensitive substance 7a. (For convenience, the combined unit consisting of drum 7 and the photosensitive substance 7a is hereinafter sometimes referred to as photosensitive drum 7.)

In the disclosed embodiment, the external signal information is temporarily stored in a microcomputer (not shown) and then fed to scanning reproducing device 16 in accordance with the program sequence placed in the computer memorey. The scanning reproducing device may be implemented—by way of example—by an optical fiber tube, thin wall tube (TWT), laser scanning device, etc. Further, reference numeral 17 in FIG. 1 is a transporting device for the recording papers following image transfer, 19 is a roller type fixing device for fixing the toner image to the recording paper, and 20 indicates a receiving tray for receiving the fixed recording papers.

Figure 2:
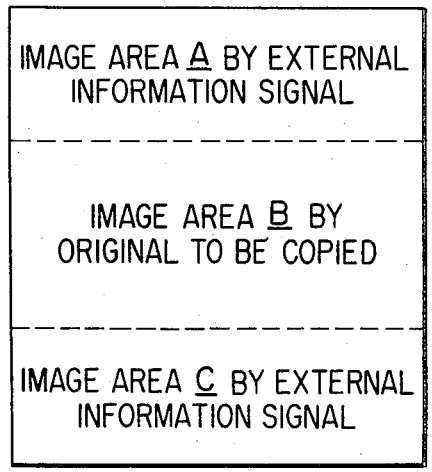
FIG. 2 shows an example of an arrangement of compound images.

In recording a compound image of exterior information signals A and C and the pictorial original B as shown in FIG. 2 utilizing the compound information recording apparatus of FIG. 1, the pictorial original M is placed on copy board 2 and movable sliders SL1 and SL2 are set at the desired positions along the original for copying. At the time when the recording operation is initiated and copy board 2 begins its movement leftward in FIG. 1, the shutter 8 is in its closed condition to shield or block the optical path, and the exposure process by the exposure lamp 3 starts. The photosensitive drum 7 begins its rotation in the direction of the arrow and the scanning reproducing device is activated to convert an exterior information signal to an optical image whereby an electrostatic latent image of the exterior information signal image A is formed on the photosensitive substance 7a. At this time the light reflected through the optical system from the original M is shielded or blocked by the shutter 8, and does not therefore reach the photosensitive substance 7a.

When copy board 2 moves further leftward and slider SL1 operatively actuates a first position detective switch SW1 arranged along the path of copy board 2, shutter 8 is opened by shutter operating means 9 and, at the same time, scanning reproducing device 16 is deactivated. Consequently, first the exterior information signal image A, and then the electrostatic latent image B of the pictorial original M, are successively formed on the photosensitive substance 7a of drum 7. Slider SL2 is set at that position at which exposure of the portion of the original to be copied or recorded is complete (since copying of the original M may include either a portion or the entirety thereof); when slider SL2 operatively actuates a second position detective switch SW2, shutter 8 is closed to once again block the optical path, and the scanning reproducing device is reactivated at the same time to form an electrostatic latent image of the exterior information signal image C successively following formation of the pictorial original image B on the drum. The electrostatic latent images—corresponding to the images A, B and C—which are formed on the photosensitive substance 7a are then developed by developing device 11, transferred by image transfer electrode 12 onto recording paper fed by a feeding means (not shown) such as a feed roller, separated from photosensitive drum 7, fixed by fixing device 19, and finally ejected onto receiving tray 20.

When a compound image as in FIG. 2 is recorded in a compound information recording apparatus utilizing a mechanical shutter to selectively block the light reflected from an original, a phenomenon known as black banding—whereby a line of a certain width appears on the boundary between the exterior information signal image A and the pictorial original image B, and on the boundary between the pictorial original image B and the exterior information signal image C—occurs. One cause of such black banding is the distance of disagreement l between a point P on the photosensitive substance 7a at which the reflected light from an original is projected and a point Q on the photosensitive substance 7a at which the light image from the scanning reproducing device 16 activated by an external information signal is projected. By way of explanation, the signal for changing the source of the image for impression on drum 7 from the exterior information signal (image A or C) to the pictorial original (image B)—or vice versa—is picked up from the sliders SL1, SL2, each of which moves together with copy board 2. Even if the scanning reproducing device 16 is activated or deactivated by the output or change-over signal from switches SW1, SW2 at the same time that the mechanical shutter is closed or opened, the finished position of signal image A and the starting position of pictorial original image B, or the finished position of pictorial original image B and the starting position of exterior information signal image C, will be spaced apart by the same distance l as exists between the points P and Q on the photosensitive substance 7a. This spacing between the adjacently disposed images on drum 7 appears as black banding therebetween when the composite latent image is developed and transferred as a visible image onto recording paper.

Figure 3:
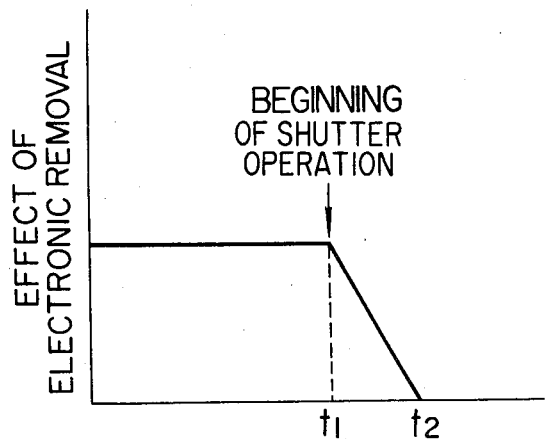
FIG. 3 is a graph illustrating the influence of the opening and shutting action of a shutter on the electric neutralizing effect of a photosensitive substance or member.

Another cause of the black banding phenomenon relates to the finite period of time T1 during the transition of the mechanical shutter between its open and closed conditions, and has a different causative basis. When the starting or finished position of a part of an original to be recorded is detected by slider SL1 and SL2 and the shutter correspondingly opened or shut, the transition between the fully shut and the fully opened state of the shutter 8 requires a finite period of time to complete. Thus, the amount of light reflected from an original M and reaching the photosensitive substance 7a is only gradually increased or decreased; that is, it can not be rapidly changed. As a result, the electric neutralizing effect on the electric charge residing on the photosensitive substance 7a is correspondingly weakened by degrees. FIG. 3—wherein the shutter 8 begins to shut at time $t_1$ when slider SL2 activates position detective switch SW2 and attains its fully closed state to completely block or shield the optical path at time $t_2$—illustrates this basis of the black banding phenomenon. The amount of light reaching the photosensitive substance 7a is accordingly only gradually decreased during the period from times $t_1$ to $t_2$, and the electric neutralizing effect caused by the impingement of light thereon is correspondingly weakened only by degrees. In seeking to prevent the occurrence of black banding caused by these bases, it might be attempted to bring the projection point P of the light reflected from an original M and the projection point Q of the exterior information signal into closer proximity, or to increase the operating speed of the shutter. However, the former method is limited by the structure of a recording apparatus, and the latter is likewise limited by the mechanical nature and structure of the shutter.

Even if the shutter operating time could be shortened to a considerable extent, the production of black banding of width corresponding to one-half of the width of the slit arranged on the optical path can not be avoided.

The present invention provides a method for removing or reducing black banding produced at the boundary between a pictorial original image and an exterior information signal image in forming a compound image thereof. In the method of the invention, information supplied in the form of an external electric signal, and as an original to be recorded or copied, are optically projected in a prescribed order onto a photosensitive drum by making use of a mechanical shutter. An electrostatic latent image thereby formed on the photosensitive drum 7 is then developed and the compound image of the external information signal and the pictorial original is recorded onto recording paper. As the image being impressed on the drum is switched between the pictorial original and the external information signal, the shutter is opened and shut through the application of a change-over signal and, at the same time, electrostatic charge remaining on the photosensitive drum due to the operating action of the shutter is removed or reduced prior to or successively after the external information is optically projected onto the photosensitive drum.

Figure 4:
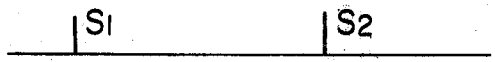
FIG. 4 shows the interrelations between various signals of the apparatus in the method to remove black banding in accordance with the present invention.
Figure 4:
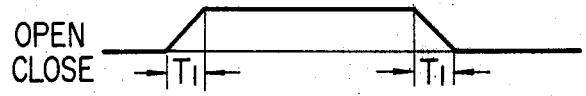
Figure 4:
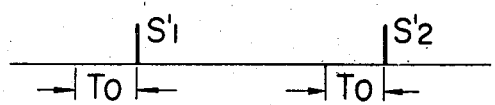
Figure 4:
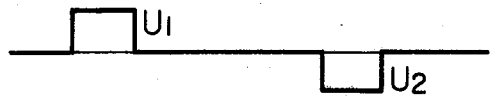
Figure 4:
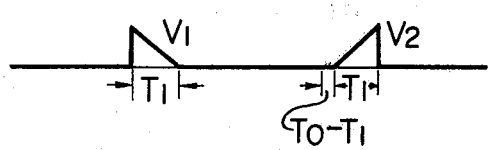
Figure 4:
Figure 4:
Figure 5:
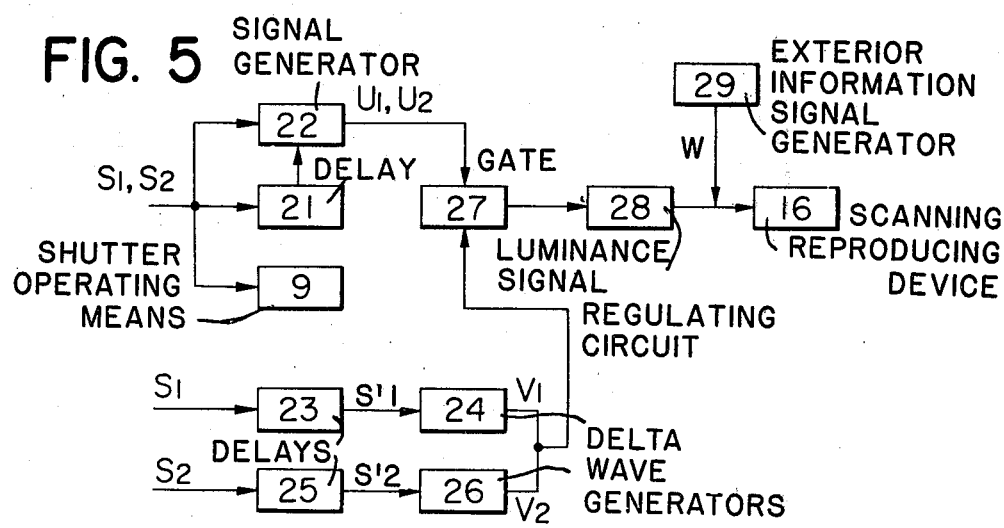
FIG. 5 is a block diagram of a circuit for carrying out the method of the present invention.

FIG. 4 illustrates the various kinds of signals in a recording apparatus and the timed relationship therebetween in accordance with the invention, and the block diagram of FIG. 5 shows a control circuit for producing the necessary signals. In FIG. 4, the signal on detecting the position of an original—that is, the image change-over signal S1 or S2—is produced by activation of the switches SW1 or SW2 by the sliders SL1 or SL2 to open or close, respectively, the shutter in accordance with the signal applied. The delayed change-over signal S1' or S2' is produced by the delayed action circuit 21 seen in the circuit of FIG. 5, and the delay or time lag $T_0$ between image change-over signal S1 and the delayed change-over signal S1', or between image change-over signal S2 and the corresponding delayed change-over signal S2' is determined by the formula $$T_0 = l/V,$$

wherein V represents the velocity of drum rotation, and l represents the distance between the projection points P and Q. Thus, the time lag $T_0$ represents that period of time required for the projection point P to reach the incident point Q.

For the purpose of preventing occurrence of the black banding phenomenon caused by disagreement of the projected points P and Q, a signal U1 is generated by a signal generator 22 triggered in response to image change-over signal S1 and delayed change-over signal S1' when the image being projected onto drum 7 changes from external information signal image A to the pictorial original image B. This signal U1 is seen in FIG. 4 to comprise a voltage step which begins at the completion or end of the external information luminous intensity signal and extends for a time $T_0$; when signal U1 is combined with the external information luminous intensity signal (FIG. 5), it has the effect of extending that signal for a period $T_0$. In like manner, a signal U2 is generated by signal generator 22 in response to image change-over signal S2 and delayed change-over signal S2'. Signal U2 is likewise seen in FIG. 4 to comprise a step of negative voltage with respect to the external information luminous intensity signal so that, when combined (FIG. 5), the beginning of the luminous intensity signal fed to the scanning reproducing device is effectively truncated for a time $T_0$ to correct for the projection point discrepancy. In addition, the image change-over signals S1 and S2 are input to the shutter operating means 9. These method steps protect against occurrence of the black banding phenomenon as caused by the aforementioned point disagreement.

To prevent black banding caused by the time lag in shutter operation, a delayed action signal—originating from image change-over signal S1 and delayed therefrom by a period of time $T_0$—is generated in a delayed action circuit 23. This delayed action signal is input to a delta wave generator 24, from which a signal V1 for correcting the shutter opening period is generated. Similarly, a delayed action signal originating from image change-over signal S2 and delayed therefrom by a period of time $T_0$-$T_1$ is generated by a delayed action circuit 25; the latter delayed action signal is then input to a delta wave generator 26 to generate a signal V2 for correcting the shutter closing or shutting period. Signals U1 and U2 for correcting point disagreement, and signals V1 and V2 for correcting shutter opening and shutting periods, are supplied to a gate 27 for regulating luminance, and the output of regulating gate 27 is applied to a luminance signal regulating circuit 28 of scanning reproducing device 16.

A luminance signal W from a fundamental external information signal generator (e.g. a letter generator) 29 is added to the luminance signal from the above-described correcting signals U1, U2, V1 and V2 (the output of circuit 28) to achieve a compound luminance signal Y. The luminance of scanning reproducing device 16 is regulated by compound luminance signal Y, thereby preventing occurrence of the so-called black banding phenomenon.

It should be understood that the present invention is not intended to be solely limited to that black banding phenomenon occurring with a scanning reproducing device in which an electric signal is converted to an optical image (e.g., an optical fiber tube, etc.). Rather the invention is equally applicable to other types of recording apparatus which utilize, for example, a discharging needle electrode.

What is claimed is:

1. In a method for forming a composite image on a photosensitive substance and for developing the composite image for transfer to a recording sheet, wherein the composite image is comprised of external information supplied to a reproduction device in the form of an electric signal for transfer to the photosensitive substance as an outputted external information signal image and an original for optical projection of an image thereof through an operable shutter onto the photosensitive substance contiguous with the external information signal image, the improvement comprising a method of eliminating black banding between the contiguous images as recorded on a recording sheet, comprising the steps of:

generating a change-over signal to open the shutter following external information signal image transfer to the photosensitive substance or to close the shutter preceding external information signal image transfer to the photosensitive substance; and smoothly varying the output of the reproduction device between no signal image output and full signal image output in response to said change-over signal.

2. In the method of claim 1 wherein the reproduction device is a scanning reproducing device, the output of which is projected onto the photosensitive surface, said step of smoothly varying the output of the reproduction device comprising smoothly varying an input to a luminance regulating circuit of the scanning reproducing device.

3. In the method of claim 2, said step of smoothly varying the input to the luminance regulating circuit of the scanning reproducing device including predeterminately delaying the change-over signal, generating a delta wave in response to the delayed change-over signal, and feeding the delta wave to the luminance regulating circuit of the scanning reproducing device.

4. In the method of claim 1 wherein transfer of the external information signal image and projection of the original image onto the photosensitive substance in consecutive relation produces a gap between or an overlap of the otherwise contiguous images on the photosensitive substance, said method of eliminating black banding including generating a correcting signal in response to the change-over signal and feeding the correcting signal to the reproduction device to correspondingly vary its output in accordance therewith, said correcting signal comprising a voltage step for predeterminately extending or truncating the full image signal output of the reproducing device.

* * * * *